United States Patent Office 2,927,639
Patented Mar. 8, 1960

2,927,639

SURFACTANT TREATMENT OF OIL AND GAS WELLS

Albert G. Schuessler and Charles B. Swain, Oklahoma City, Okla., assignors to Swift & Company, Chicago, Ill., a corporation of Illinois, and Mud Control Laboratories, Inc., Oklahoma City, Okla., a corporation of Delaware No Drawing. Application November 23, 1956
Serial No. 623,781

24 Claims. (Cl. 166—42)

This invention, in general, relates to treatment of oil and gas bearing subterranean formations to improve the permeability thereof to flow of oil and gas and to compositions used in said treatment. More specifically, the invention comprises the treatment of oil and gas bearing formations with a surface active material capable of effectively removing connate water and water contamination of drilling fluids from the capillary interstices of the subterranean formations as a low viscosity, water-in-oil emulsion.

Oil and gas bearing substrata usually comprise sand or porous rock through which the oil or gas must flow to the well bore where it flows or is pumped to the surface. As a rule, water is uniformly distributed throughout the porous formation in the form of thin films adhering to the formation particles. In addition, drilling procedures with aqueous base drilling fluids further contaminate the formations with additional water and solid particles. It has been established that the presence of water is undesirable in productive formations because it is, in many instances, highly resistant to oil and gas flow through the formation to the well bore. The velocity of the oil as it flows through the formation's interstices is not always sufficient to disrupt the interfacial forces between the formation particles and connate water or water which has invaded the formation during the drilling procedure.

It is generally accepted that the failure of many oil bearing formations to attain the production potentially indicated by core analysis results from several factors. The adherence of aqueous films to the formation particles is clearly illustrated by the fact that core analyses have often shown the presence of 10–50% water in the formation; yet, the production from these formations is all oil. The permeability of these formations to oil is disproportionately adversely affected by water content above approximately 10%. As the amount of water above this figure increases one fold, the resistance to flow of oil is increased many fold. Further, regardless of water blocking, the resistance increases disproportionately as the size of the capillary openings becomes smaller—thus aggravating the problem of water blocking in sands having small openings through which the oil passes to the well bore.

The most critical portion of the formation with regard to permeability is that part immediately surrounding the well bore. The pressure drop is much greater in the sand immediately adjoining the bore than at a greater distance from the bore. It is estimated that as much pressure is required to drive the oil through one foot of formation adjoining the bore as is required for the next ten feet. Hence, by increasing the permeability of the formation near the well face one achieves about the same effect as an increase in permeability throughout the entire formation.

Many oil sands contain intergranular clays which through base exchange mechanism swell when invaded by filtrates of sodium base muds. Thus, as the calcium base clay is invaded with a fluid rich in sodium ions, the calcium ion on the clay particles will be displaced by sodium to give a swelling of the clay particles. In this state, a permanent permeability block may be established only inches from the bore wall. It has been observed that in sands of 160 millidarcys or less, fifty percent of the permeability may be lost during the completion, whereas, in zones having permeability of 30 millidarcys or less, it is not uncommon to experience complete water-blocking of a pay on which drill stem tests have indicated commercial production. The same problem may be caused by invasion of clay particles from conventional drilling fluids.

Thus, lowered production in many existing wells results from a combination of circumstances which include formation damage at the time of drilling by invasion of aqueous drilling fluids, the presence of connate water in the subterranean formation and the accumulation of high melting paraffins in the area immediately surrounding the bore hole.

It is therefore an object of this invention to provide a composition designed for the treatment of oil and gas bearing formations to increase their permeability to oil and gas.

A further object is to provide a composition for treatment of oil and gas bearing formations by removal of water from the interstices of the formation by the use of a composition which materially lowers the interfacial forces between the water and productive formation and preferentially oil wets the formation.

Another object is to provide a method for treating oil bearing sands with the treating fluid of this invention whereby connate water is removed as a low viscosity, water-in-oil emulsion.

A further object is to provide a method for treating oil and gas bearing sands by lowering of interfacial forces between water and the productive formation and, at the same time, provide an oil-wet sand in place of the formerly water-wet sand.

Another object is to provide a method for treating producing sands prior to or after high pressure fracturing to further increase their productivity.

Another object is to provide a method for treating oil producing sands after acidation to further increase the productivity of the producing sands.

Other objects will be apparent to one skilled in the art from the following detailed description.

In general, the present invention relates to a composition designed for treatment of oil and gas bearing formations to increase their permeability and also to techniques for treating oil wells to increase their productivity. This composition is made up of a surface active agent and an oil soluble oil wetting agent. The surface active constituent of said composition is a metal salt of sulfated sperm oil. The primary surface active ingredients are alkali metal salts of sulfated esters of long chain fatty monohydric alcohols and long chain fatty acids. A paraffin solvent may be added as an ingredient, if desired, to remove accumulated paraffin in the bore and surrounding sands.

More specifically, the treating fluid comprises a surface active composition which will provide a low surface tension between the connate water in the producing sands and the oil filtrate of the treating fluid. The composition substantially decreases the interfacial forces between the connate water and producing sands to aid in removal of the water and by decreasing said forces between the connate water and sand, enables the oil in the producing formation to displace the water in the capillary channels of the sand, thus opening the channels to oil flow into the bore. In concentrations recommended in this description, the surface active composition reduces the surface tension of water to 28–32 dynes/cm., and interfacial tension will range from 3–8 dynes/cm. Furthermore, the water is removed as the internal non-continuous phase of a low viscosity water-in-oil emulsion, and is thus more easily removed.

A preferred all-purpose formulation includes an alkali metal salt of sulfated sperm oil as the major constituent, and an oil wetting agent, such as lead petroleum sulfonate, and a paraffin solvent as minor constituents. The paraffin solvent is preferably methyl isobutyl ketone because it additionally serves as an emulsion coupling agent. Other coupling and solvent agents which may be used in the instant invention include methyl isobutyl carbinol, methyl ethyl ketone, and isopropyl alcohol, although a coupling agent is not necessary in all cases in achieving the benefits of this invention. Other suitable oil wetting agents in addition to the aforementioned lead petroleum sulfonate include alkyl aryl sulfonates, amine alkyl aryl sulfonates, and carboxylic acid salts of amino alkyl amides, such as are disclosed in United States Patent No. 2,737,509 to Murray Jelling. The carboxylic acid radicals of the salts are selected from $C_{12}$–$C_{20}$ fatty acid radicals and rosin acid radicals.

The following formulation is supplied as a specific example of the composition of this invention. The proportions are in parts by weight:

| | Parts |
|---|---|
| Sodium salt of sulfated sperm oil _____ 84% ⎫ | |
| Defoamer (residue from propane decolorization of fatty materials) _____ 16% ⎬ | 60 |
| Lead petroleum sulfonate solution (20% by weight of sulfonate in petroleum distillate) _____ | 20–25 |
| Methyl isobutyl ketone _____ | 20–15 |

The lead petroleum sulfonate per se ranges from 4–5 parts by weight in the above formulation.

The following formulation also sets forth a specific example of the compositions encompassed by this invention. The proportions are in parts by weight:

| | Parts |
|---|---|
| Sodium salt of sulfated sperm oil _____ 84% ⎫ | |
| Defoamer (residue from propane decolorization of fatty materials) _____ 16% ⎬ | 60 |
| Carboxylic acid salt of an amino alkyl amide (acid radicals from group consisting of $C_{12}$–$C_{20}$ fatty acid radicals, rosin acid radicals and mixtures thereof) _____ | 20–25 |
| Emulsion coupling agent _____ | 20–15 |

Lead petroleum sulfonate has been found to be especially effective as an oil wetting agent in the above formulation. The function of the oil wetting agent is to provide a means for oil wetting the formation particles after the water has been removed from the particle surface through the interfacial tension reduction previously described.

Although a defoamer is not required in the formulation of this invention, it has been found that a defoamer contributes additional surface activity to the fluid. The preferred defoamer is a mixture of complex compounds obtained as the residue from propane decolorization of fatty materials. This composition is more fully described in United States Patent No. 2,668,138 issued to John J. Walker and John E. Farbak on February 2, 1954. Other suitable defoamers are pine oil, castor oil, linseed oil, and sugar cane oil.

The method of treating wells with compositions of this invention, in general, involves the addition of the composition to crude lease oil or other mineral oil which is pumped into the subterranean formations slowly at low pressure. Initial rate of flow should be about ½–1 barrel per minute. The well is then closed for a short period, usually 16 to 24 hours. Occasionally, the well flows without further assistance, but, if not, the tubing is swabbed until the well kicks off. If the well is a pumping well, swabbing should be continued until all of the treating composition is recovered or until clean oil appears. Treatments before or after high pressure fracturing and after acidation follow this general procedure.

A typical treatment of oil sands involves the addition of the above formulation to crude oil in the ratio of one drum (approximately 54 gallons) to twenty barrels (42 gallons each), respectively. The ratio of formulation to oil is not of any critical importance and may be varied, if desired. The tubing is then filled with the treating fluid which is displaced to the perforations or open pay zone with oil. If the tubing contains clean oil, it is unnecessary to open the by-pass as the clean oil can be forced ahead of the treating fluid. However, if the oil is dirty, the best procedure is to open the by-pass on the packer to avoid pumping the dirty oil into the formation. After the treating fluid has reached the production zone, the by-pass on the packer is closed and pressure is built up slowly to force the treating fluid into the sand with minimum pressure. One-half to one barrel per minute is an average initial rate. If possible, it is preferred to speed up the injection rate after initial penetration of the sand by the treating fluid.

The well is then shut in and allowed to stand for 16–24 hours or longer, if desired. If the well will flow, the oil is passed into the tanks. Otherwise, the tubing is swabbed until the well kicks off. If the well is a pumping well, swabbing should be continued until all of the treating fluid is recovered or until clean oil appears.

The characteristics of wells treated according to the above described process indicate that the problem encountered in decreasing production was largely due to the presence of connate water in the capillary channels of the producing sand. After the treatment oil is recovered, most wells produced sizeable quantities of water even though the wells were not known to produce water prior to treatment. As the flow of water decreases, it is followed by an increasing percentage of oil as new production. During subsequent days of operations, the percentage of water decreases and in most cases, oil production continues at a steady rate, usually approximating the original productivity of the well.

When the treating fluid is mixed with crude oil and pumped slowly and uniformly into an oil sand, the interfacial tension between the formation water and sand is materially reduced. The forces holding the water are disrupted, freeing the water for dispersion in the oil phase as the internal or discontinuous phase. The sand becomes oil wet due to the oil wetting properties of the oil wetting agent. When the flow is reversed, the water is produced into the bore in the form of a low viscosity water-in-oil emulsion containing dehydrated mud solids. In the same manner, mud filtrate, acid, water and the like can be removed from the body of the sand. The surface active agent will also work on mud or mud solids in the same manner as on the natural formation to aid in restoring the original permeability. Experience has shown that gas/oil ratios are reduced, and bottom hole pressure tests show a rapid build-up in pressure following treatment with the fluids of this invention.

The procedures for high pressure fracturing and acidation are well known in the art and will not be described in detail here. High pressure fracturing generally is accomplished by exertion of pressure on a fracturing fluid containing a gelatinous material and sand. After fracturing the formation, the gelatinous material is flushed out by the ensuing flow of crude oil, and the added sand serves as a packing material to retain the fissures or cracks produced by the high pressure fracture. It has been found that the addition of the treating fluid of this invention prior to and/or after the fracturing process improves the productivity of the well. Treatment before sandfracing can reduce as much as 1,000 pounds the hydraulic pressure necessary to accomplish fracture by removing the block at the sand face. In the treatment prior to sandfracing, the treating fluid may be recovered in the manner previously described, or, alternatively, the fracture may be accomplished in the presence of the treating fluid. In this instance, the back-up or clean-up step prior to fracture is omitted.

An acidation generally involves the treatment of calcite formations with a strong acid to make said formations more permeable to oil flow. The use of an acid containing some water and the presence of connate water in the formation sets up interfacial tensions between the water and producing sands which are then treated with the treating fluid in a manner described above for increasing the productivity of a declining well.

The following examples are furnished to illustrate the utility of the treating fluid herein disclosed and should not be construed as placing any limitation on the invention other than defined in the appended claims.

Example I

In a dual completion of Hart and Springer sands in Oklahoma, the Hart sand had been damaged by water during completion and failed to produce following completion although drill stem tests had shown the zone to be of high potential production. On fracturing, the well failed to respond; whereupon, this treatment was followed by treatment with another type of material designed to clean up the sand by deemulsification of water and oil presumed to be providing the permeability block. No perceptible improvement was observed as a result of this treatment even after prolonged swabbing.

The Hart sand was then treated with the treating composition of this invention by the procedure heretofore described. The particular treating composition employed is as follows:

| | Parts |
|---|---|
| Sodium salt of sulfated sperm oil ......... 84% | |
| Defoamer (residue from propane decolorization of fatty materials) .............. 16% | 60 |
| Lead petroleum sulfonate solution (20% by weight of sulfonate in petroleum distillate) .......... | 20–25 |
| Methyl isobutyl ketone .................... | 20–15 |

Following the treatment, the load oil and treating fluid was recovered by swabbing. During two ensuing swabbing periods of 9 and 10 hours duration, formation produced an average of 17 barrels per hour. In the early clean-up period and after swabbing, the presence of considerable water, solids and external oil phase emulsion was observed in the flowing product. For lack of an available unit, swabbing was discontinued. During the following several weeks, it was determined that the well would flow naturally with a yield of 160–170 barrels per day. Under the allowable in effect, the well yields 40 barrels per day.

Example II

An old, normally flowing well in Southeast Moore Field, Cleveland County, Oklahoma, which had declined in productivity to 3 or 4 barrels per day was injected with 20 barrels of the treating fluid of this invention in crude oil, followed by 50 barrels of crude oil to move the treating fluid into the formation. The particular treating solution employed is as follows:

| | Parts |
|---|---|
| Sodium salt of sulfated sperm oil ........ 84% | |
| Defoamer (residue from propane decolorization of fatty materials) .............. 16% | 60 |
| Carboxylic acid salts of an amino alkyl amide (acid radicals from group consisting of $C_{12}$–$C_{20}$ fatty acid radicals, rosin acid radicals and mixtures thereof) ................................. | 20–25 |
| Paraffin solvent ............................ | 20–15 |

Swabbing was started the following day during which time the load oil and part of the "chaser" was recovered. Swabbing was discontinued overnight and during the ensuing 17 hours, the well flowed 21.5 barrels to the stock tank. The well is presently pumping its allowable. During and after the treatment, considerable water in the form of an external oil phase emulsion and very fine solids were recovered.

This application is a continuation-in-part of abandoned application Serial No. 493,284, filed March 9, 1955, by Albert G. Schuessler and Charles B. Swain.

Obviously, many modifications and variations of the invention as hereinbefore set forth may be made without departing from the spirit and scope thereof, and therefore only such limitations should be imposed as are indicated in the appended claims.

We claim:

1. A composition adapted for treatment of oil and gas bearing formations to increase the productivity thereof comprising an alkali metal salt of sulfated sperm oil as the major constituent and as a minor constituent an oil wetting agent selected from the group consisting of lead petroleum sulfonate, an alkyl aryl sulfonate, an amine alkyl aryl sulfonate, a carboxylic acid salt of an amino alkyl amide, and mixtures thereof, the carboxylic acid radicals of said salt being selected from the group consisting of $C_{12}$–$C_{20}$ fatty acid radicals, rosin acid radicals and mixtures thereof.

2. A composition adapted for treatment of oil and gas bearing formations to increase the productivity thereof comprising an alkali metal salt of sulfated sperm oil as the major active constituent by weight and as a minor constituent by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof.

3. A composition adapted for treatment of oil and gas bearing formations which comprises: an alkali metal salt of sulfated sperm oil as the major active constituent by weight and as minor constituents by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof, and an emulsion coupling agent.

4. The composition of claim 3 wherein the emulsion coupling agent is from the group consisting of methyl isobutyl ketone, methyl isobutyl carbinol, methyl ethyl ketone, and isopropyl alcohol.

5. A composition adapted for treatment of oil and gas bearing formations to improve the permeability thereof which comprises the following active ingredients in approximate parts by weight:

| | Parts |
|---|---|
| Sodium salt of sulfated sperm oil ........ 84% | |
| Defoamer (residue from propane decolorization of fatty materials) .............. 16% | 60 |
| Carboxylic acid salt of an amino alkyl amide (acid radicals from the group consisting of $C_{12}$–$C_{20}$ fatty acid radicals, rosin acid radicals and mixtures thereof) ...................... | 20–25 |
| Emulsion coupling agent ...................... | 20–15 |

6. A method of treating oil bearing sands to increase the productivity thereof comprising pumping into a well at a slow rate mineral oil containing a composition comprising an alkali metal salt of sulfated sperm oil as the major active ingredient by weight and a carboxylic acid salt of an amino alkyl amide, the carboxylic acid radicals of said salt being selected from the group consisting of $C_{12}$–$C_{20}$ fatty acid radicals, rosin acid radicals and mixtures thereof, as a minor ingredient by weight; forcing the treating oil down to the producing sand; allowing the treating oil to remain in contact with said sands for a period of several hours; swabbing the well and, at the same time, slowly recovering the treating fluid.

7. A method of treating oil and gas bearing formations to improve the permeability thereof which comprises: introducing into the formation a treating fluid containing as the major active ingredient by weight an alkali metal salt of sulfated sperm oil and as a minor ingredient by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof; allowing said composition to remain in contact with said formation for a period of time; and reversing the flow of the fluid for removal of water and other substances held by said fluid.

8. A method for treating oil and gas bearing formations containing water wet solids to improve the permeability thereof which comprises: forcing a hydrocarbon oil treating fluid into said producing sands at low pressure, said fluid containing as the major active ingredient by weight an alkali metal salt of sulfated sperm oil to reduce interfacial tensions between the formation and water held therein, and as a minor ingredient by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof; allowing said composition to remain in contact with said formation for a period of time; and reversing the flow of the fluid for removal of water and other substances held by said fluid said water being emulsified in said hydrocarbon oil as an internal non-continuous phase whereby the formation solids are rendered oil wet and oil wet mud solids are removed from the formation.

9. A method for treating oil and gas bearing formations containing water wet solids to improve the permeability thereof which comprises: forcing a hydrocarbon oil treating fluid into said producing sands at low pressure, said fluid containing as the major active ingredient by weight an alkali metal salt of sulfated sperm oil to reduce interfacial tensions between the formation and water held therein, and as minor ingredients by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof, and methyl isobutyl ketone; allowing said composition to remain in contact with said formation for a period of time; and reversing the flow of the fluid for removal of water and other substances held by said fluid whereby the formation solids are rendered oil wet and oil wet mud solids are removed from the formation.

10. A method of improving the permeability of oil and gas bearing subterranean formations by hydraulic fracture, the improvement which comprises: slowly forcing into the formation a mineral oil having dissolved therein an alkali metal salt of sulfated sperm oil as the major active ingredient by weight and as a minor ingredient by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof; allowing the treating fluid to remain in contact with the formation for a period of time; and reversing the flow of the treating fluid for removal of water as a low viscosity water-in-oil emulsion from the formation after hydraulic fracture.

11. A method of improving the permeability of oil and gas bearing subterranean formations which comprises: contacting said formation with a concentrated mineral acid; withdrawing the spent acid water from said formation and the well bore; and, following the acid treatment, contacting the acid treated formation with a mineral oil having dissolved therein an alkali metal salt of sulfated sperm oil as the major active ingredient by weight and as a minor ingredient by weight a carboxylic acid salt of an amino alkyl amide, the carboxylic acid radicals of said salt being selected from the group consisting of $C_{12}$–$C_{20}$ fatty acid radicals, rosin acid radicals and mixtures thereof; and reversing the flow in the well to withdraw the treating fluid after said fluid has been in contact with said formation for at least several hours.

12. A method of treating oil and gas bearing formations to improve the permeability thereof which comprises: introducing into the formation a treating fluid containing as the major active ingredient by weight an alkali metal salt of sulfated sperm oil and as a minor ingredient by weight lead petroleum sulfonate; allowing said composition to remain in contact with said formation for a period of time; and reversing the flow of the fluid for removal of water and other substances held by said fluid.

13. A method for treating oil and gas bearing formations having water wet solids to improve the permeability thereof which comprises: forcing a hydrocarbon oil treating fluid into said producing sands at low pressure, said fluid containing as the major active ingredient by weight an alkali metal salt of sulfated sperm oil to reduce interfacial tensions between the formation and water held therein, and as a minor ingredient by weight lead petroleum sulfonate; allowing said composition to remain in contact with said formation for a period of time; and reversing the flow of the fluid for removal of water and other substances held by said fluid, said water being emulsified in said hydrocarbon oil as an internal non-continuous phase whereby the formation solids are rendered oil wet and oil wet mud solids are removed from the formation.

14. A method for treating oil and gas bearing formations containing water wet solids to improve the permeability thereof which comprises: forcing a hydrocarbon oil treating fluid into said producing sands at low pressure, said fluid containing as the major active ingredient by weight an alkali metal salt of sulfated sperm oil to reduce interfacial tensions between the formation and water held therein, and as minor ingredients by weight lead petroleum sulfonate and methyl isobutyl ketone; allowing said composition to remain in contact with said formation for a period of time; and reversing the flow of the fluid for removal of water and other substances held by said fluid whereby the formation solids are rendered oil wet and oil wet mud solids are removed from the formation.

15. A composition adapted for treatment of oil and gas bearing formations to increase the productivity thereof comprising: an alkali metal salt of sulfated sperm oil as the major active constituent by weight and as a minor constituent by weight lead petroleum sulfonate.

16. A composition adapted for treatment of oil and gas bearing formations which comprises: an alkali metal salt of sulfated sperm oil as the major active constituent by weight and as minor constituents by weight lead petroleum sulfonate and an emulsion coupling agent.

17. The composition of claim 16 wherein the emulsion coupling agent is from the group consisting of methyl isobutyl ketone, methyl isobutyl carbinol, methyl ethyl ketone, and isopropyl alcohol.

18. A composition adapted for treatment of oil and gas bearing formations which comprises: an alkali metal salt of sulfated sperm oil as the major active constituent by weight and as minor constituents by weight lead petroleum sulfonate and methyl isobutyl ketone.

19. A composition adapted for treatment of oil and gas bearing formations to improve the permeability thereof which comprises the following active ingredients in approximate parts by weight:

| | Parts |
|---|---|
| Sodium salt of sulfated sperm oil | 60 |
| Lead petroleum sulfonate | 4–5 |
| Emulsion coupling agent | 15–20 |

20. A treating fluid for oil and gas bearing formations to improve the permeability thereof which comprises: a mineral oil having dissolved therein an alkali metal salt of sulfated sperm oil as the major active ingredient by weight and lead petroleum sulfonate as a minor ingredient by weight.

21. A treating fluid for oil and gas bearing formations to improve the permeability thereof which comprises: a mineral oil having dissolved therein the sodium salt of sulfated sperm oil as the major active ingredient by weight and as a minor ingredient by weight lead petroleum sulfonate.

22. A method of treating oil bearing sands to increase the productivity thereof comprising pumping into a well at a slow rate mineral oil containing a composition comprising an alkali metal salt of sulfated sperm oil as the major active ingredient by weight and lead petroleum sulfonate as a minor ingredient by weight, forcing the treating oil down to the producing sand; allowing the treating oil to remain in contact with said sands for a period of several hours; swabbing the well and, at the same time, slowly recovering the treating fluid.

23. A method of improving the permeability of oil and gas bearing subterranean formations by hydraulic fracture, the improvement which comprises: slowly forcing into the formation a mineral oil having dissolved therein an alkali metal salt of sulfated sperm oil as the major active ingredient by weight and as a minor ingredient by weight lead petroleum sulfonate; allowing the treating fluid to remain in contact with the formation for a period of time; and reversing the flow of the treating fluid for removal of water as a low viscosity water-in-oil emulsion from the formation after hydraulic fracture.

24. A method of improving the permeability of oil and gas bearing subterranean formations which comprises: contacting said formation with a concentrated mineral acid; withdrawing the mineral acid from said formation and the well bore; and, following the acid treatment, contacting the acid treated formation with a mineral oil having dissolved therein an alkali metal salt of sulfated sperm oil as the major active ingredient by weight and as a minor ingredient by weight lead petroleum sulfonate; and reversing the flow in the well to withdraw the treating fluid after said fluid has been in contact with said formation for at least several hours.

References Cited in the file of this patent

UNITED STATES PATENTS

| | | |
|---|---|---|
| 2,095,778 | Wechsler | Oct. 12, 1937 |
| 2,223,933 | Garrison | Dec. 3, 1940 |
| 2,345,713 | Moore et al. | Apr. 4, 1944 |

OTHER REFERENCES

Emulsion Technology, 2nd edition, published 1946 by Chem. Publishing Company of Brooklyn, pp. 15 and 16.